United States Patent [19]
Andrews et al.

[11] Patent Number: 5,842,204
[45] Date of Patent: Nov. 24, 1998

[54] METHOD AND APPARATUS FOR TRANSLATING SOURCE CODE FROM ONE HIGH-LEVEL COMPUTER LANGUAGE TO ANOTHER

[75] Inventors: Kristy A. Andrews, Palo Alto; Paul Del Vigna; Mark E. Molloy, both of San Jose, all of Calif.

[73] Assignee: Tandem Computers, Inc., Del.

[21] Appl. No.: 332,966

[22] Filed: Nov. 1, 1994

Related U.S. Application Data

[63] Continuation-in-part of Ser. No. 319,682, Oct. 7, 1994.

[51] Int. Cl.⁶ ........................................... G06F 7/00
[52] U.S. Cl. ..................... 707/31; 707/102; 341/51; 341/79; 364/251.5; 364/251.6; 364/243; 364/244
[58] Field of Search ................... 395/700, 600, 395/701, 670; 364/300, 200, 419, 251.5, 251.6, 243, 244; 707/102, 3; 341/51

[56] References Cited

U.S. PATENT DOCUMENTS

| | | | |
|---|---|---|---|
| 4,599,691 | 7/1986 | Sakaki et al. | 364/419 |
| 4,667,290 | 5/1987 | Goss et al. | |
| 4,794,528 | 12/1988 | Hirose et al. | 364/300 |
| 4,868,743 | 9/1989 | Nishio | 364/200 |
| 4,956,809 | 9/1990 | George et al. | |
| 4,989,132 | 1/1991 | Mellender et al. | |
| 5,151,697 | 9/1992 | Bunton | 341/51 |
| 5,276,874 | 1/1994 | Thomson | 395/600 |

FOREIGN PATENT DOCUMENTS

| | | |
|---|---|---|
| 0 361 737 A3 | 4/1990 | European Pat. Off. |
| 0 583 117 A2 | 2/1994 | European Pat. Off. |

OTHER PUBLICATIONS

Interacting with Structured–Oriented Editor, Int. J. Man–Machine Studies (1992) 37, 299–418.

A New Tree Type Data Structure with Homogeneous Nodes Suitable for a very Large Special Database, Yutaka Ohsawa and Masao Sakauchi, Data Eng. 1990 6th Int. Conf.

Implementing the Patricia Data Structure for Compression Algorthms with Finite Size Dictionaries. J. Jiang, Data Transmission, IEEE, Conf. Pub. 456.

Platoff, Michael, et al. "An Integrated Program Representation and Toolkit for the Maintenance of C Programs", *Proceedings, Conference on Software Maintenance Sorrento*, Oct. 15–17, 1991, No. Oct. 15, 1991, Institute of Electrical and Electronics Engineers, 129–137.

Ladd, D.A., et al. "A*: a Language for Implementing Language Processors", *Proceedings of the International Conference on Computer Languages, Toulouse, May 16–19, 1994*, No. Conf. 5, May 16, 1994, Institute of Electrical and Electronics Engineers, 1–10.

International Preliminary Examination Report dated Jan. 23, 1997, PCT/US95/14206.

Albrecht, Paul F.; Garrison, Phillip E.; Graham, Susan L.; Hyerle, Robert H.,; Ip, Patricia; and Krieg–Bruckner, Bernd, "Source–to–Source Translation: Ada to Pascal and Pascal to Ada," (1980) ACM 0–89791–0303/80/1200/0183, pp. 183–193.

(List continued on next page.)

*Primary Examiner*—Alvin E. Oberley
*Assistant Examiner*—Majid A. Banankhah
*Attorney, Agent, or Firm*—Townsend and Townsend and Crew LLP; Larry Mendenhall

[57] ABSTRACT

A method and apparatus for translating source code written in one computer language to source code written in another language wherein translated static fragments are generated in the face of textual inconsistencies. Exactly one target language definition of each source language static fragment is generated and the differences are encapsulated in new parameters.

21 Claims, 12 Drawing Sheets

OTHER PUBLICATIONS

Atkinson, Russ, Demers, Alan; Hauser, Carl; Jacobi, Christian; Kessler, Peter; and Weiser, Mark, "Experiences Creating a Portable Cedar," Xerox PARC, CSL–89–8 Jun. 1989, pp. 1–12.

Bartlett, Joel F., "Scheme >C a Portable Scheme–to–C Compiler," ©Digital Equipment Corporation, (1989), pp. 1–25.

Lemkin, Peter F., "Psail: Sail to C," *Computer Language*, Aug., 1985, pp. 39–45.

Moynihan, Vincent D.; Wallis, Peter J.L., "The Design and Implementation of a High–Level Language Converter," *Software Practice and Experience*, vol. 21(4), (Apr. 1991), pp. 391–400.

Waters, Richard C., "Program Translation via Abstraction and Reimplementation," *IEEE Transactions on Software Engineering*, vol. 14, No. 8, (Aug., 1988), pp. 1207–1228.

Weiner, J.L.; Ramakrishnan, S., "A Piggy–back Compiler for Prolog," ©1988 ACM 0–89791–269–1/88/0006/0288, pp. 288–296.

"SA–SCULPTOR/TAL TAL to C Conversion from Tandem TAL to ANSI C," prepared by Systems Automation, Inc., ©Systems Automation, Inc. 1992–93, 10 pp.

"Recommendations for TAL to Tatem C Translation," prepared by Software Engineering and Enhancement Center, Dec. 7, 1989, 55 pp.

"Project Plan for pTAl to C++ Translator," ©Tandem Computers Incorporated, (1992), 64 pp.

METHOD AND APPARATUS FOR TRANSLATING SOURCE CODE FROM ONE HIGH-LEVEL COMPUTER LANGUAGE TO ANOTHER

This application is a continuation-in-part of our application Ser. No. 08/319,682, filed Oct. 7, 1994, said application being assigned to Tandem Computers Incorporated.

BACKGROUND OF THE INVENTION

This invention relates to automated translation between high-level computer programming languages.

This invention relates particularly to improved preservation in a target high-level computer language of invocation expressions and preprocessor characteristics (such as macros, source file inclusion structure, and commentary) contained in a source high-level computer language.

High-level computer languages enable computer programmers to communicates with computers. Statements programmers write in a computer language form a computer program which in turn instructs a computer to perform a set of tasks. "Compilation" is the process of converting high-level computer language programs into instructions, generally called machine code, which the computer can understand and execute. A compiler is a computer program which performs this translation.

In general, each brand of computer understands a different set of machine code instructions. Therefore, a different compiler must exist for each computer to translate a high-level computer language. Because compilers for every high-level computer language do not exist for every brand of computer, not every program can execute on every machine. Programmers can only write programs in the languages for which compilers exist for their target computers.

Nonetheless, it is highly desirable to have a single computer program run on as many brands of computers as possible. Application programs are typically complex and difficult to write; rewriting programs in multiple languages to run on multiple brands of computers is impractical. Likewise, compilers are difficult to write; providing them for every language for every brand of computer is equally impractical. One way of addressing these problems has been the development of well known, widely used, standardized high-level languages. Compilers for these languages are available for a wide variety of computers.

The development of standardized languages has not been a complete solution. There exist numerous high-level languages, and many large programs written in them, which are exotic, highly specialized, little used, obsolete, or designed for specific computers. Many computers do not have compilers available for these languages.

Because many high-level computer languages, whether or not they are standardized, cannot be compiled on every computer, programs must be translated to other languages. While translation can be done by hand, it is a laborious, time consuming, and expensive process prone to error. To address this problem, automatic translators have been and continue to be developed to translate programs written in one high-level language to another.

Automatic translators may be used in either of two distinct strategies to solve the problem of an unavailable compiler for a particular language on a particular computer. First, programmers may continue to write and maintain programs in the original source language. The translator converts these programs into intermediate code in a target language. An available compiler for the target language then converts this intermediate code into machine code which the target computer can understand. Although the target language is usually a standard, widely available language, the translator does not have to produce readable or maintainable source code.

The second strategy requires a translator to produce readable and maintainable code. Programmers going this route want to abandon the original language in favor of the target. Building this type of translator is a more difficult task and is the focus of this invention.

Prior art attempts to build translators which produce readable code have had differing goals and various levels of success. Syntax of some high-level languages has been successfully transformed into syntax of other high-level languages. Some translators have produced attractively formatted target code. While source code comments have been migrated to target code, their placement has not always been optimal. Translators have also attempted to transform the style of programs to make them more readable. Others have used knowledge-based systems to extract the meaning of the source program and rewrite it in the target language.

However, prior art translators fail to preserve programming constructs known as preprocessor characteristics. Many high-level languages include a preprocessor language separate from but coexisting with the language itself. Characteristics of the preprocessor language may include a conditional compilation mechanism, a macro mechanism, a source inclusion mechanism, a variety of compiler directives, and a comment mechanism. Some of the preprocessor features allow programmers to use shorthand invocation expressions for longer constructs. Thus, invoking the shorthand expression triggers a text substitution when the source code is run through the preprocessor.

The parent application (08/319,682) describes a method for translation of text substitution preprocessor characteristics. One important aspect of the method described therein is that the text invoked by invocation expressions (for example, text included from another file, text that is the body of an expanded macro, macro actual parameter text that has been substituted in place of a macro formal parameter) must be translated in its context of use. These substitution text sources are called "static fragments". The static fragments cannot be translated immediately at their points of definition because even if the text could be parsed, semantic analysis is not possible. Static fragments are, therefore, translated after their invocations have been expanded and analyzed in their contexts of use.

It is possible that the source language text associated with an invocation expression might translate to different target language text in different contexts of use. A textual mismatch might occur, for example, when type compatibility rules are more strict in the target language than in the source language, requiring a type cast where none appeared in the source language. If the type cast were different in different contexts of use, a textual mismatch would occur.

A source-to-source translator must select a strategy for generating translated static fragments in the face of textual inconsistencies. One possible method is to generate more than one target language definition of the static fragment. This strategy presents readability and maintainability problems; a single point of definition is desirable.

SUMMARY OF THE INVENTION

The present invention is directed to a method and apparatus for a source-to-source translator. A specific object of the present invention is to provide a strategy for generating translated static fragments in the face of textual inconsistencies. The method described generates exactly one target language definition of each source language static fragment and encapsulates the differences in new parameters.

It is a further object of the present invention to provide a method and apparatus for "tree surgery;" the dissection of a hierarchical tree data structure and the insertion of a node at the point of the dissection.

Other and further objects of the present invention will be apparent from the following description and claims and are illustrated in the accompanying drawings which, by way of illustration, show preferred embodiments of the present invention and the principles thereof and what are now considered to be the best mode contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF INVENTION

Figure 1:
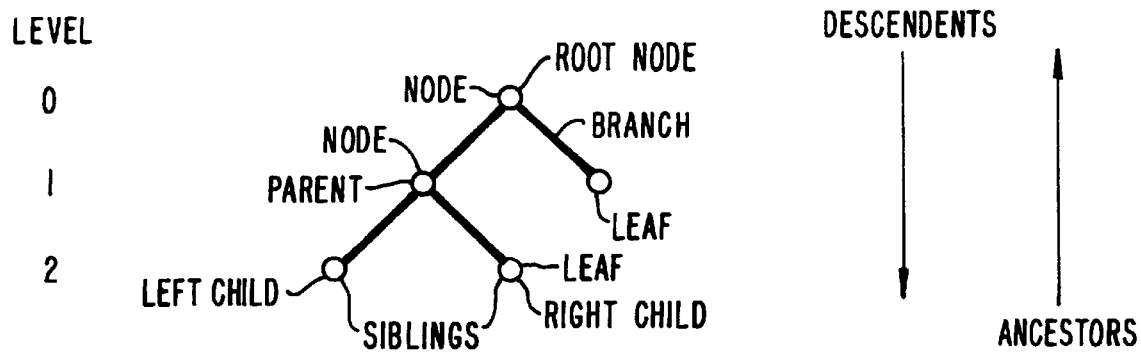
FIG. 1 depicts a prior art tree data structure.

This section describes translation of macro definitions during source-to-source translation even when translation inconsistencies appear between two uses of one macro in different contexts. The Rosetta Translator implements this technique.

Concepts

The following concepts are key to this description of a method for preserving macros:

Virtual Source A program's virtual source is the stream of tokens that a compiler parses to create a syntax tree representing a program. Virtual source does not necessarily exist in textual form in any single source file; the token stream is created by a series of macro expansions, macro formal parameter substitutions, and source inclusions.

Fragment A fragment represents the result of a macro expansion, a macro actual parameter substitution, or a source file inclusion. These preprocessor mechanisms can appear anywhere in a source file and yield any portion of a syntactic construct; they need not honor syntactic construct boundaries.

Fragment Tree A fragment tree represents expansions of macros, substitutions of macro actual parameters, and inclusions of source that were used by the scanner or preprocessor to create the program's virtual source.

Fragment Consistency

The Rosetta Translator pieces together textual representations of target language fragments to form target language output files, fitting a textual representation of a macro body, for example, into its definition. Because the Rosetta Translator's design requires that each source language macro maps to exactly one target language macro, it checks that every macro use is textually identical, to ensure that the macro text "works" in all contexts of use. The scope of a macro actual parameter is limited to the macro body itself, so the Rosetta Translator need only check that all expansions of a formal parameter within a given macro expansion are textually identical.

Fragments Containing Puns or New Semantic Information

When the syntax for expressing two different operations is different in the target language but the same in the source language, a fragment translation might not "work" in every context of use. In programming languages as in natural language, puns tend to translate poorly. When type compatibility rules differ between the two languages, type casts can lead to a mismatch in macros that are used in conjunction with multiple types. When the translated code requires different semantic information from the original code, different contexts of use can also yield a mismatch.

The following example illustrates an error condition: the translation of two expansions of the same macro result in different macro body text. All instances of a macro body must be checked for consistency before output source generation. The Rosetta Translator generates references to macros, such as "_redef" and "_tobitfield" in this example, that encapsulate the emulation of difficult pTAL features. In this case, the integer field "a" overlays the bit field "k". The "_tobitfield" macro takes the name of the surrounding class type as a parameter. That name is different for the two uses of the macro: "f_" versus "g_". The following example depicts a macro whose two uses result in macro body text that does not match; mismatching tokens are in bold.

| pTAL Macro | |
| --- | --- |
| define fields = | |
|     int a [0:-1]; | |
|     unsigned (1) k #; | |

| pTAL Code | C+ Code |
| --- | --- |
| struct f; | class f__{ |
| begin |   fields; |
|   fields; | } f; |
| end; | |
| struct g; | class g__ { |
| begin |   fields; |
|   fields; | } g; |
| end; | |

| pTAL Expansion | C++ Expansion |
| --- | --- |
| struct f; | class f__ { |
| begin |   _redef(short, a, |
|   int a [0:-1]; |     _tobitfield(f__, k)); |
|   unsigned (1) k; |   unsigned k:1; |
| end; | } f; |
| struct g; | class g__ { |
| begin |   _redef(short, a, |
|   int a [0:-1]; |     _tobitfield(g__, k)); |
|   unsigned(1) k; |   unsigned k:1; |
| end; | } g; |

EXAMPLE 1
Macro and Two Uses, Resulting in a Mismatch
Blurred Fragment Boundaries If a construct translation blurs fragment boundaries, the translated fragment tree looks as if two instances of the fragment were created, and the contents of those fragments are not textually identical. Fragment boundary violations are detected by the same fragment consistency check that detects puns that do not work. The following example illustrates a blurred fragment boundary in a use of an ill-formed macro.

If precedence rules differ between the two languages, then introducing parentheses to preserve the original expression's semantics can lead to a consistency violation. The pTAL language assigns higher precedence to the left shift operator than to the addition operator. The C++ language assigns higher precedence to the addition operator than to the left shift operator. Parentheses appear in the target language version of the expression to retain the order of evaluation. The parentheses tokens happen to be generated from the higher precedence operator, which determines their fragment assignment.

pTAL Code
    define fred(p)=p<<2#;
    a :=fred (x+1);
Expansion of pTAL Code
    a :=x+1<<2;
Generated C++ Code
    a=x+(1<<2);

EXAMPLE 2
Macro Containing a Low Precedence Operator

The translation of the previous example results in a C++ fragment tree that appears to have two instances of the actual parameter fragment which do not contain identical text.

Minimizing Inconsistently Translated Macros and Macro Actual Parameters

Inconsistently translated macro bodies and macro actual parameters car be minimized by building special rules into the token mapping algorithms, when possible.

Suppress simplifying transformations on the generated code when inside of a macro expansion. Generally, syntax transformations are not sensitive to whether or not the generated code is inside of a macro body expansion or macro formal parameter expansion. Some routines that perform construct translations are sensitive to fragment boundaries, though they do not translate fragments. These routines suppress simplifying transformations within a macro expansion or macro formal parameter expansion in order to make translations for different macro invocations textually identical. For example, the transformation simplifying the text "&arrayvar[0]" to "arrayvar" is suppressed within a macro when the index is in a macro parameter. Likewise, the transformation simplifying the text "(*ptr).field" to "p->field" is suppressed when "*p" is a macro actual parameter.

Absorb tokens that differ between invocations of a macro into an actual parameter, when possible. Source language tokens might generate not only the logical translation of themselves, but also some attendant baggage. If that baggage can differ in two different invocations of the same macro, there is no problem if the baggage is mapped to the actual parameter rather than the macro body. For example, C++ parentheses generated to force the appropriate operator precedence should be absorbed into the translated actual parameter if they surround C++ tokens generated only from pTAL actual parameter tokens.

Likewise, if a C++ "*" operator was generated in the translation of an implicitly dereferenced pointer in a macro actual parameter, the "*" operator should be absorbed into the translated actual parameter so that nonpointer variables can be passed into the macro.

Extrude tokens that differ between invocations of a macro into the fragment containing the macro invocation syntax. Similar to the previous description, if the differing tokens are on the edge of the C++ translation of a macro body, there is no problem if they are mapped outside. For example, if a C++ type cast applies to an entire macro expansion, then the generated text should show the type cast applied to the macro invocation syntax.

Remedies For Inconsistently Translated Macros and Macro Actual Parameters

Although a careful design of token associations, taking into account common coding practices in the source language, can ensure that fragment mismatch problems are a rare event, it cannot prevent all possible problems. When an inconsistently translated macro or macro actual parameter occurs, the user can choose from three remedies. Each of the remedies can solve any fragment mismatch problem. If the macro in question is exported, changing the macro interface in the original language implementation is usually not possible.

Recode the macro body so that the translation "works." This is viable if recoding the body of the macro avoids the problematic construct and does not disturb the interface or the usage of the macro. If recoding the macro requires changes at all points of use, then this might not be a viable solution.

Give the Rosetta Translator permission to expand all uses of the macro. This eliminates any fragment mismatch problem at the cost of deimplementing the macro that contained a problem. It is not a desirable solution if the macro was useful for improving the usability maintainability, or readability of the software, or if the macro was exported. It is a viable solution if the product maintainer is not interested in preserving the macro.

The following is an example.
pTAL Code define !expand! shifty (x, y)=x <<y#;

a :=shifty(2, 3);

Generated C++ Code a=2 <<3;

Example 3

Expanding a Macro

Give the Rosetta Translator permission to create an additional macro parameter to encapsulate the differences. This eliminates any fragment mismatch problem. It has the potential of producing actual parameters in the target language code that are less sensible than a programmer would write.

Recalling the example of a mismatching macro body from Example 1, the differences can be encapsulated as shown in the following example.

```
pTAL Macro

!zero-length array causes a to overlay k!
define fields !FORMAL:stype! =
    int a [0:-1];
    unsigned(1) k #;
Generated C++ Macro define fields(stype)         \
    _redef(short, a, _tobitfield(stype, k)); \
    unsigned k: 1
```

| pTAL Code | Generated C++ Code |
|---|---|
| struct f; | class f_ { |
| begin | fields(f_); |
|   fields; | } f; |
| end; | class g_ { |
| struct g; | fields(g_); |
| begin | } g; |
|   fields; | |
| end | |

Example 4

Encapsulating a Textual Mismatch

Encapsulating Macro Body Mismatches and Actual Parameter Mismatches

This section describes the target language fragment tree transformations necessary to encapsulate textual mismatches between two expansions of a macro.

Textual Mismatches

Because the Rosetta Translator is designed to generate exactly one target language macro corresponding to each source language macro, it performs a consistency check on every target language instance of each macro body and each macro actual parameter, to ensure that they translate to the same target language text in every context of use. If they do not match, it is an error condition. Example 1 illustrates this error condition.

On encountering a mismatch between two expansions of one macro, the Rosetta Translator calculates the subsequences of differing tokens. The differences appear as follows. The bracketed tokens are boundaries of the mismatch, and are not included in the new actual parameter. If one token subsequence is empty, the boundary tokens show where to place the formal parameter.

| [(] | [(] |
|---|---|
| f_ | g_ |
| [,] | [,] |

Example 5

Token Differences

When the fragment mismatch occurs in a target language macro body or macro actual parameter, the Rosetta Translator emits a diagnostic suggesting that the user remedy the problem by specifying a new formal parameter to encapsulate the difference.

Specifying Ghost Parameters

The encapsulation of textual differences in a parameter in a translated macro's definition and invocations is a useful remedy for errors arising from textually inconsistent translations of different expansions. We call this new parameter a "ghost" parameter.

The user specifies a meaningful formal parameter name in a special comment in the macro definition. The comment does not disturb the behavior of the original source code. The following example illustrates the specification of a ghost parameter.

```
pTAL Code

!zero-length array causes a to overlay k!
define fields !FORMAL:stype!=
    int a [0:-1];
    unsigned(1) k #;
```

Example 6

Specifying a Ghost Formal

A ghost parameter exists in the translated target language versions of a macro; only the comment specifying the ghost formal parameter name appears in the source language code.

Introducing Ghost Formal Uses to Encapsulate Mismatches

Recall from Example 1 the textual differences in the macro expansion.

| pTAL Expansion | C++ Expansion |
|---|---|
| struct f; | class f_ { |
| begin |   _redef(short, a, |
|   int a [0:-1]; |     _tobitfield(f_, k)); |
|   unsigned(1) k; |   unsigned k:1; |
| end; | } f; |
| struct g; | class g_ { |
| begin |   _redef(short, a, |
|   int a [0:-1]; |     _tobitfield(g_, k)); |
|   unsigned(1) k; |   unsigned k:1; |
| end; | } g; |

Example 7

Two Macro Uses

Figure 9:
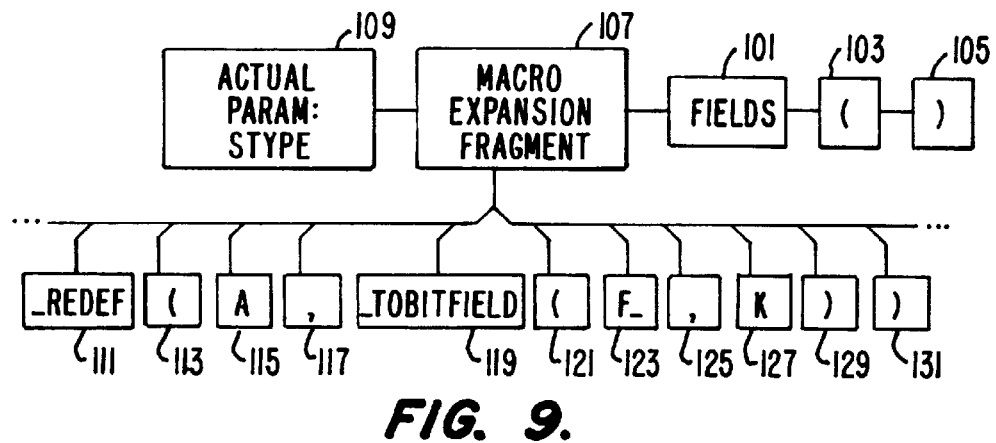
FIG. 9 is an example of a virtual fragment tree.
Figure 10:
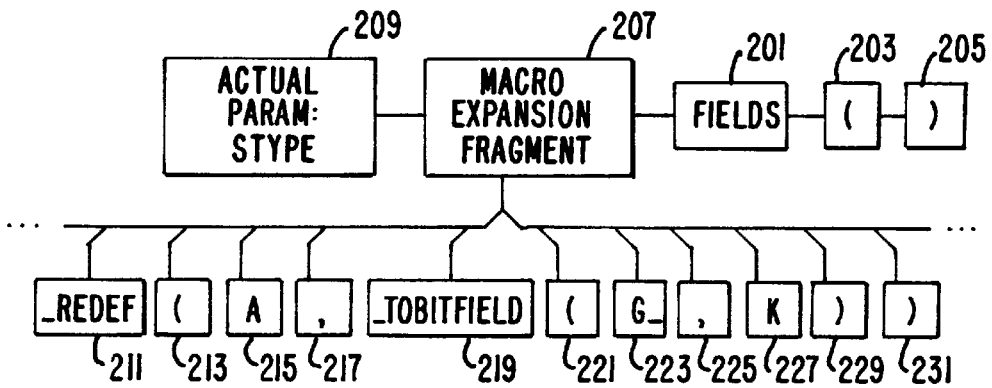
FIG. 10 is a second example of a virtual fragment tree.

The C++ fragment subtrees in FIG. 9 and FIG. 10 illustrate that the two instances of the macro expansion contain subsequences of tokens that do not match textually.

Figure 11:
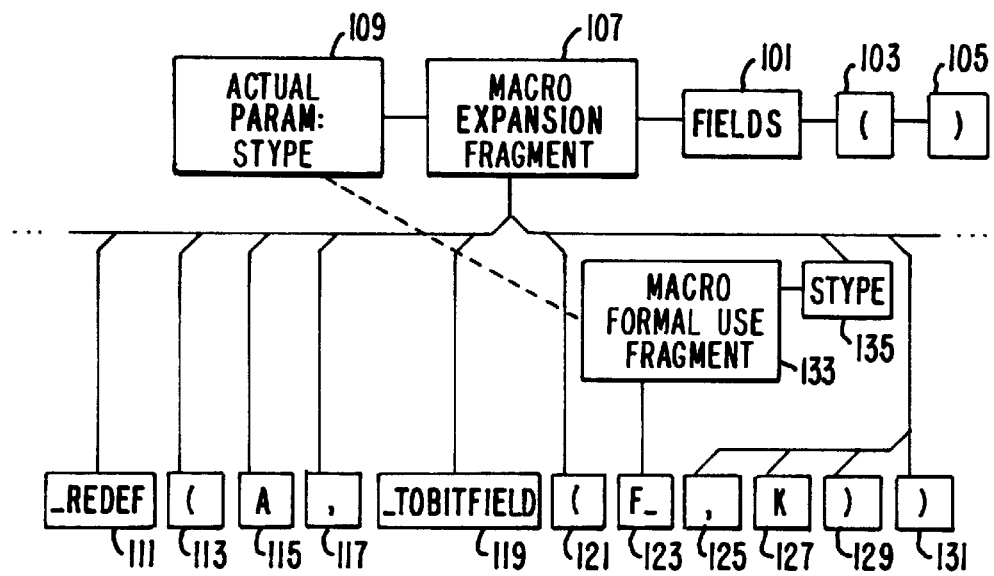
FIG. 11 is an example of the use of a ghost formal.
Figure 12:
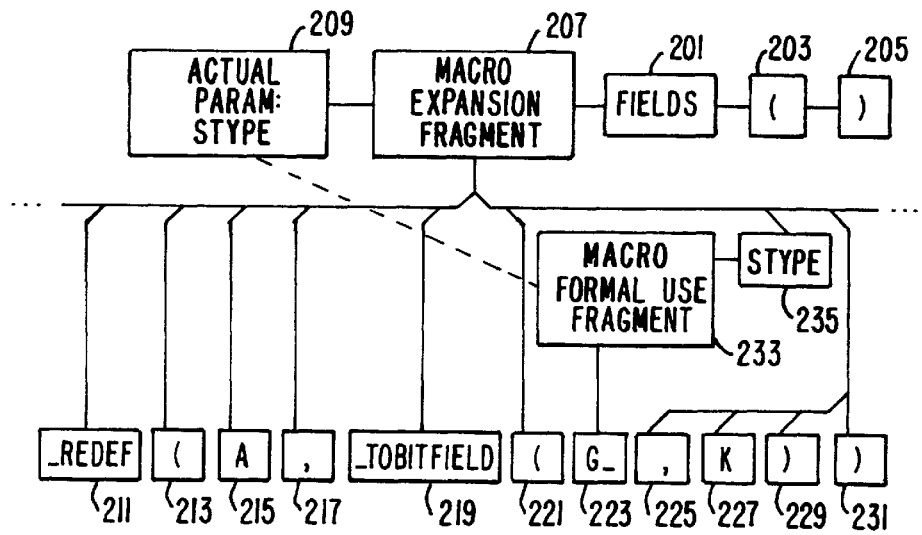
FIG. 12 is an second example of the use of a ghost formal.

The Rosetta Translator adjusts the target language fragment tree to introduce a use of the ghost formal parameter, as illustrated by FIG. 11 and FIG. 12. The dashed line indicates an instance of the actual parameter.

The Rosetta Translator generates the following text after ghost parameter substitution:

```
pTAL Macro

!zero-length array causes a to overlay k!
define fields !FORMAL:stype! =
        int a [0:-1];
        unsigned(1) k #;
C++ Macro /*zero-length array causes a to overlay k*/
define fields(stype)                        \
        __redef(int, a, __tobitfield(stype, k));   \
        unsigned k:1
```

| pTAL Code | C++ Code |
|---|---|
| struct f; | class f__ { |
| begin | fields(f__); |
|   fields; | } f; |
| end; | |
| struct g; | class g__ { |
| begin | fields(g__); |
|   fields; | } g; |
| end; | |

Example 8

Generated C++ Text

Propagating Ghost Formal Uses to Subsequent Macro Expansions

When a ghost formal use is introduced into a macro expansion, then all other expansions of that macro must take on an analogous ghost formal use. A comparison between the other fragments representing Expansions of that macro and a fragment into which the formal use was introduced reveals a textual mismatch between the formal use and tokens that await encapsulation in the other fragments. For example, if the macro "fields" were used in a third place, then a comparison of the tokens in each macro expansion would reveal a mismatch between a token representing the formal parameter name and tokens that should be encapsulated within a new use of the formal.

```
C++ Macro

/*zero-length array causes a to overlay k*/
#define fields(stype)                       \
        __redef(int, a, __tobitfield(stype, k));  \
        unsigned k:1
pTAL Code struct h;
begin
  fields;
end;
```

| pTAL Expansion | C++ Expansion |
|---|---|
| struct h; | class h__ { |
| begin |   __redef(short, a, |
|   int a [0:-1]; |     __tobitfield(h__, k)); |
|   unsigned(1) k; |   unsigned k:1; |
| end; | } f; |

Example 9

Third Macro Use Compared to First After Substitution

The differences appear as follows; the bracketed tokens are synchronization points:

| | |
|---|---|
| [(] | [(] |
| stype | h__ |
| [,] | [,] |

Example 10

Token Differences

The Rosetta, Translator notices that the only token in the first differing subsequence is the name of a macro formal parameter, and introduces a new formal use in the second fragment encapsulating the tokens in that parameter.

| pTAL Code | C++ Code |
|---|---|
| struct h; | class h__ { |
| begin | fields(h__); |
|   fields; | } f; |
| end; | |

Example 11

Propagated Formal Parameter Use

Earlier in this paper, we mentioned that the bodies of unused macros are not translated, and shared interface files containing macro definitions tend to be translated incrementally, as a side effect of translating the modules that use them. The Rosetta Translator performs a consistency check between each macro body and that produced, if any, during a previous translation session. It must propagate any ghost formal parameter uses from previous translation sessions into the current translations of the macro body, as shown in the last example.

Figure 17:
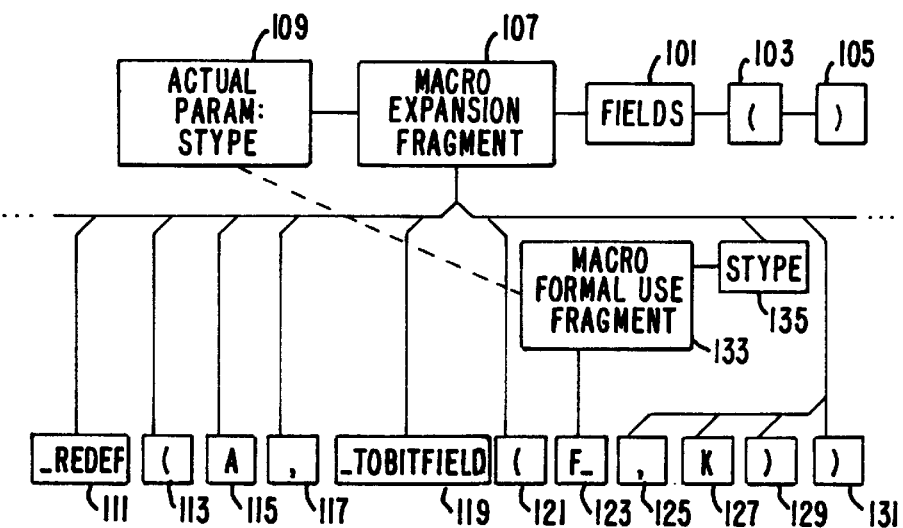
FIG. 17 is an example of a virtual fragment tree into which a formal use has been introduced.
Figure 18:
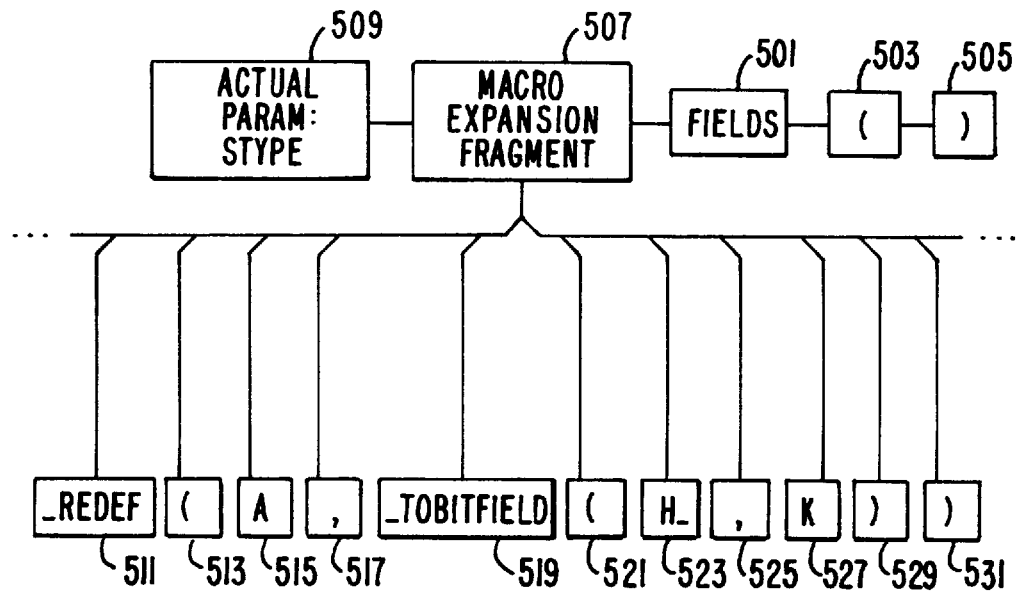
FIG. 18 is an example of a virtual fragment tree.

FIG. 17 illustrates a macro expansion into which a formal has been added to encapsulate a difference with a second macro expansion. FIG. 18 illustrates a third macro expansion. The formal use from the first macro expansion is propagated into the third, yielding the macro expansion depicted in FIG. 19.

Multiple Uses of a Formal Parameter

When multiple mismatches are textually identical, then they can be encapsulated in the same formal parameter. For example, if the define "fields" were expanded to contain two integer fields that overlay bit fields, then there would be two textually identical mismatches. Both sets of differences can be resolved with one ghost parameter.

```
pTAL Macro

!zero-length array causes a to overlay k!
define fields !FORMAL;stype! =
        int a [0:-1];
        unsigned(1) k;
        int b [0:-1];
        unsigned(1) x#;
C++ Macro /*zero-length array causes a to overlay k*/
define fields(stype)                           \
        __redef(short, a, __tobitfield(stype, k));  \
        unsigned k:1;                           \
        __redef(short, b, __tobitfield(stype, x));  \
        unsigned x:1
```

| pTAL Code | C++ Code |
|---|---|
| struct f; | class f__ { |
| begin | fields(f__); |

```
    fields              } f;
  end;
  struct g;             class g_ {
  begin                    fields(g_);
    fields;             } g;
  end;
```

Example 12
Generated C++ Text

Figure 13:
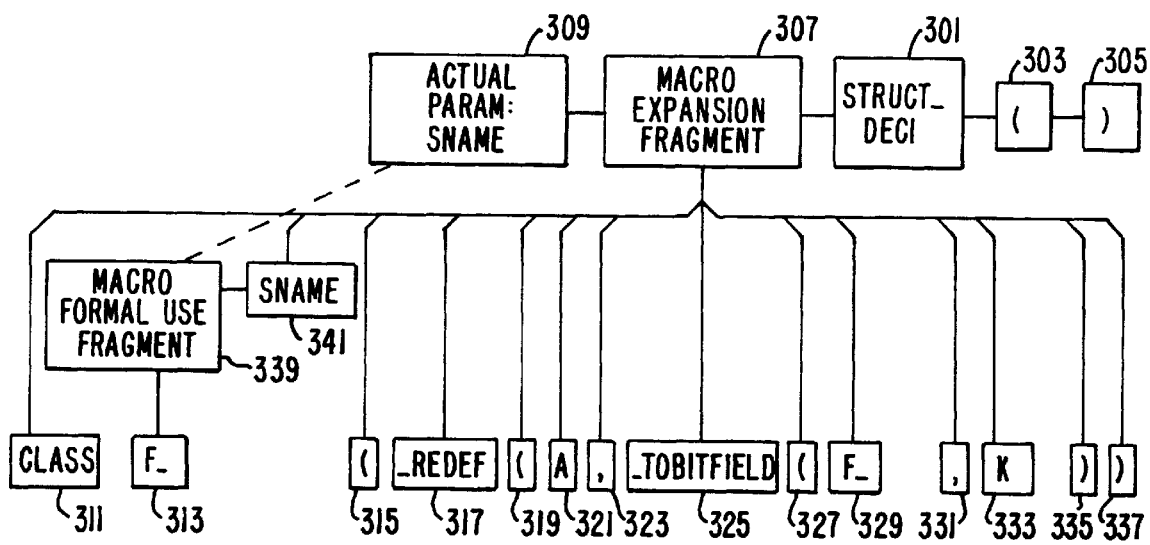
FIG. 13 is an example of a virtual fragment tree that contains a use of a macro parameter.
Figure 14:
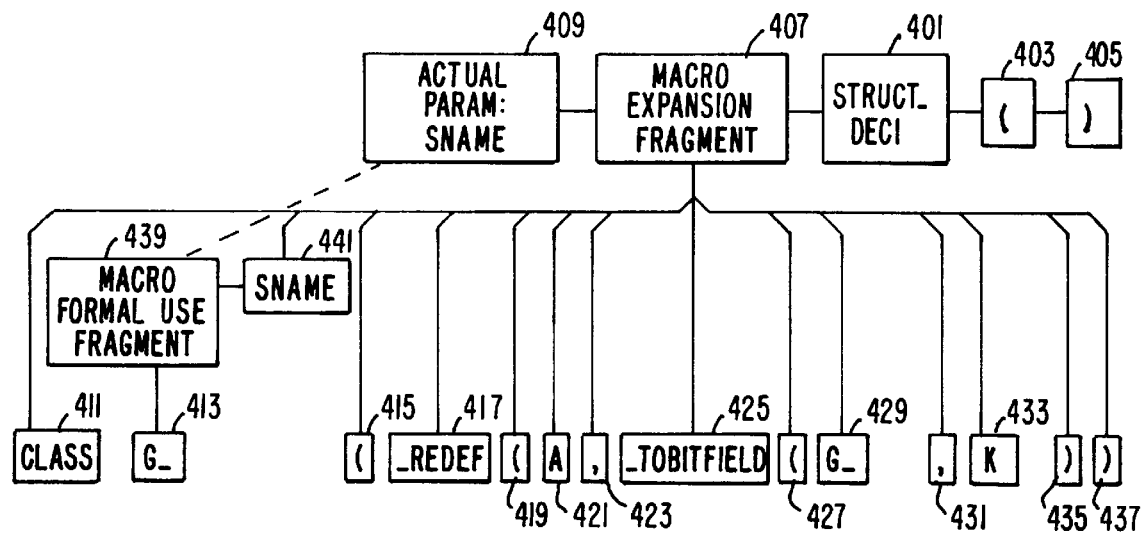
FIG. 14 is a second example of a virtual fragment tree that contains a use of a macro parameter.
Figure 15:
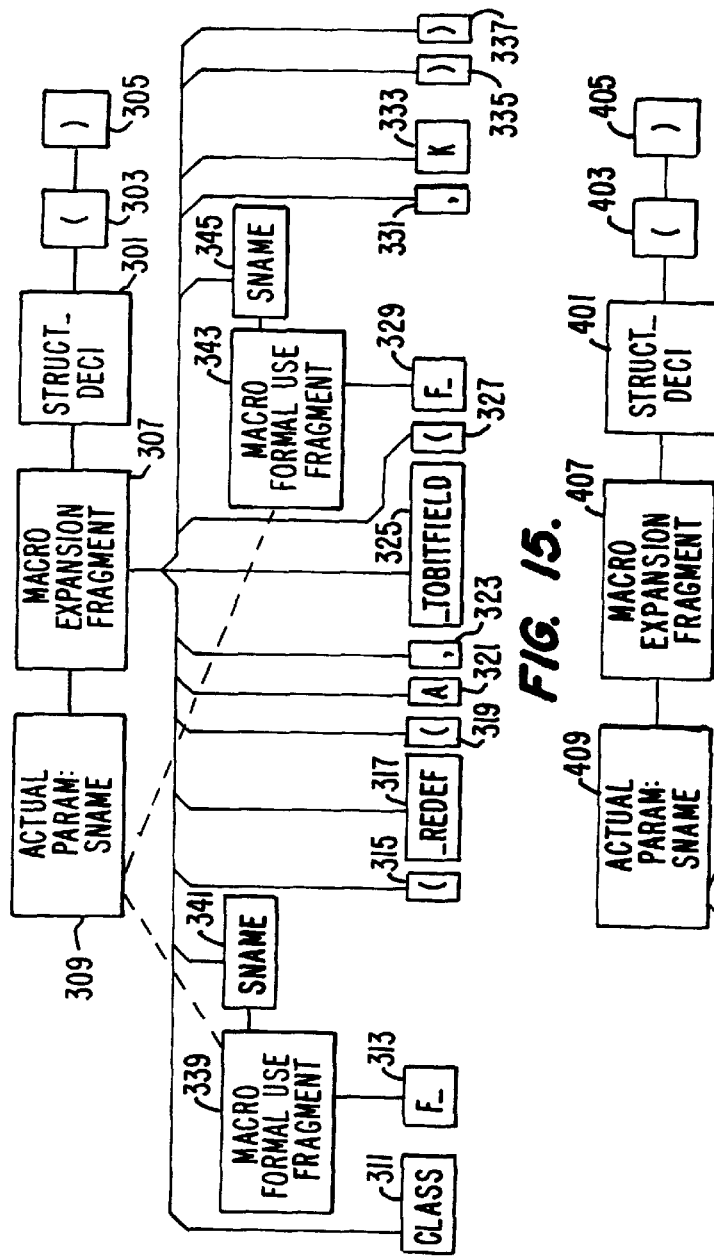
FIG. 15 is an example of the reuse of a formal parameter.
Figure 16:
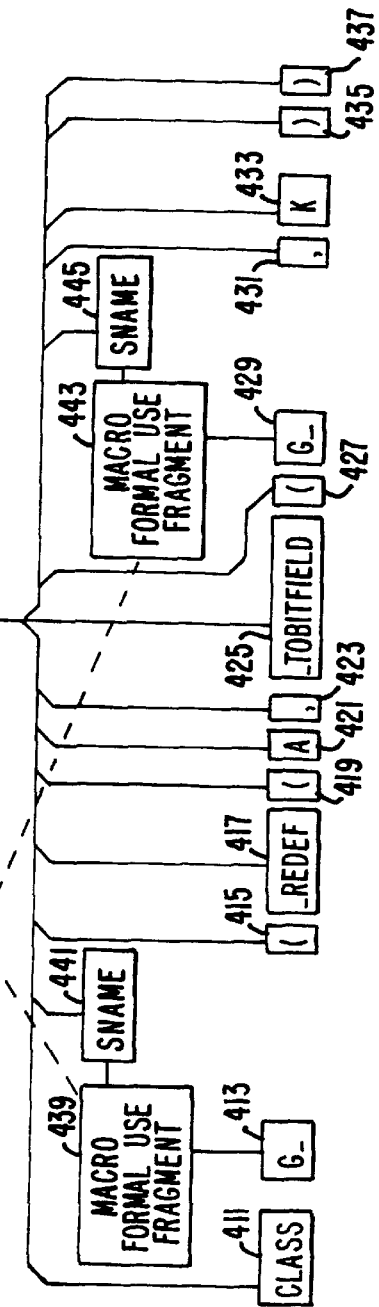
FIG. 16 is a second example of the reuse of a formal parameter.

FIG. 13 and FIG. 14 illustrate a textual mismatch in two instances of a fragment with an existing formal use. FIG. 15 and FIG. 16 depict the reuse of the formal parameter to encapsulate the textual mismatch. The following example code is illustrated in these figures.

```
pTAL Macro define struct_decl(sname) =
  struct sname;
  begin
    int a[0:-1];
    unsigned(1) k:
  end#;
pTAL Code struct_decl(f);
struct_decl(g);
```

| pTAL Expansion      | C++ Expansion                  |
|---------------------|--------------------------------|
| struct f;           | class f_ {                     |
| begin               |   _redef(short, a,             |
|                     |     _tobitfield(f_,k));        |
| int a[0:-1];        |   unsigned k:1;                |
|   unsigned(1) k;    | };                             |
| end;                |                                |
| struct g;           | class g_ {                     |
| begin               |   _redef(short, a,             |
|                     |     _tobitfield(g_,k));        |
| int a[0:-1];        |   unsigned k:1;                |
|   unsigned(1) k;    | };                             |
| end;                |                                |

```
C++ Code struct_decl(f_);
struct_decl(g_);
C++ Macro define struct_decl(sname)                              \
  class sname {                                         \
    _redef(short, a, _tobitfield(sname,k));             \
    unsigned k:1;                                       \
  }
```

Example 13
Reusing a Formal Parameter
Actual Parameter Mismatches

When the Rosetta Translator detects a mismatch between two expansions of a macro formal parameter in the same macro expansion, there is a potential error condition. Again, if a new formal is available, a use of the new formal is substituted in place of one of the parameters.

GLOSSARY OF TECHNICAL TERMS

Augmentation—As in the context "invocation expression augmentation"—augmentation means adding additional expressive elements, for example adding additional actual macro parameters to an invocation expression which is a macro invocation.

Automatic Translator—A computer program which translates computer programs written in one programming language (the "source language") into semantically equivalent programs in another programming language (the "target language".)

C++—The industry-standard programming language which the Rosetta translator uses as its target language.

Cast—Same as "Type Cast".

Code File—A file containing machine instructions; usually a code file may be loaded into random access memory and executed directly by a computer.

Comment—Explanatory text placed within a computer program which is ignored by the compiler, and therefore has no effect on what the program actually does when it runs. Comments must be specifically delimited so that the compiler knows to ignore them. For example, in C++, text between the character pairs "/*" and "*/" is treated as commentary.

Comment Mechanism—The means by which comments are delimited in a program source and ignored by the compiler; see "Comment".

Compilation—The process by which a compiler translates a program source into an executable code file.

Compiler—A program which performs the process of compilation. Most often, a compiler is used to translate from program source written directly by a programmer into a code file suitable for direct execution by a computer.

Compiler Directive—A programming language construct typically considered "outside" the actual programming language which controls some aspects of a compiler's behavior, such as whether a listing of the program being compiled is produced or not.

Computer Programming Language—The set of rules by which a computer program may be specified. These rules specify such things as how memory locations are named, and how operations are performed on data in those locations.

Computer Language—Same as "Computer Programming Language".

Computer Program—Generic term for a set of instructions to control the operation of a computer. The term "computer program" is used to refer either to a program source as written by a programmer, or the code file produced by compiling a program.

Conditional Compilation Mechanism—Means of specifying whether or not certain sections of program text should be ignored by a compiler depending on the setting of named or numbered switches. Such regions are specifically delimited by special markers which name the switch. Conditional compilation is useful, for example, in getting a program to behave slightly differently when it is compiled with the different switch settings.

Context of Use—The set of identifiers which are "in scope" at the point in a program's source where a construct is used, and the relative position of the construct within containing constructs, is called its "context of use".

Define—Synonym for "macro".

Encapsulation—Figuratively, to hide something within a wrapper or capsule. In the context of "encapsulating fragment differences", this is done by representing a subsequence of tokens in one virtual fragment which differs from a subsequence of tokens in another virtual fragment corresponding to the same static fragment in interposed virtual fragments whose invocation syntaxes will be the same for both of the original virtual fragments. This effectively hides, or encapsulates, the text differences from the two virtual fragments. For example, if two virtual fragments are instances of the same static fragment which is a macro, but there is a textual difference between the text rendering of the two virtual fragments, then that difference can be encapsulated in a macro actual parameter substitution. Each virtual fragment gets a new virtual fragment whose invocation syntax is the name of a new formal parameter; this takes the place of the differing token subsequences, which become macro actual parameters augmenting the invocation expression of the macro at its sites of call.

Encapsulating Fragment—A fragment used to encapsulate differences between two virtual fragments which are instances of the same static fragment. See discussion under "Encapsulation", above.

File—A computer memory, usually kept on durable media such as magnetic disk. Files can typically be located by name and can be created, written, read, and deleted.

Fragment—A fragment represents the ordered sequence of tokens resulting from a macro expansion, a macro actual parameter substitution, or a source file inclusion. These preprocessor mechanisms can appear anywhere in a source file and can yield any portion of a syntactic construct; they need not honor syntactic construct boundaries. A fragment may contain tokens representing invocation expressions for nested fragments.

Fragment Boundary—The first and last tokens of the contiguous ordered token sequence which forms a fragment.

Fragment Tree—A fragment tree represents the macro expansions, macro actual parameters substitutions, and source file inclusions which were used by the scanner or preprocessor to transform the program source files into the program's virtual source.

Fragment Mismatch—If the translation of two instances of the same static fragment do not have identical text, then the textual differences are referred to as fragment mismatches.

Ghost Formal Parameter—A macro formal parameter which exists in the target language text but not in the source language text.

High-Level Computer Programming Language—A computer programming language which is relatively independent of the instruction set to which it is compiled. High-level computer languages are considered "good" because they can be compiled and run on more than one brand or model of computer.

Instance—The instantiation of a programming language construct. For example, if a macro "m" is used 10 times at different places in a program source, then the point of each use, plus the text generated by that use, form a single instance of the macro, for a total of 10 instances.

Invocation Expression—A sequence of tokens which indicates that the compiler or text preprocessor should perform a particular text substitution. For example, an invocation expression in the programming language C++ which indicates that the contents of the source file 'f.h' should be substituted at the point of the invocation expression is '#include "f.h"'.

Machine Code Instruction—(also "machine instruction")—The specification of an operation which can be performed directly by a computer. For example, adding the contents of two memory registers.

Machine Instruction—Synonym for "Machine Code Instruction".

Macro—(also "Define")—A named sequence of tokens which a compiler or preprocessor will substitute for a use of the name within program source. Macros may also have formal parameters, which are just names specified with the definition of the macro. For each formal named, a separate sequence of tokens must be provided at the site of the macro invocation; the compiler or preprocessor will then substitute these latter sequences at each point of the macro expansion where the name of the formal is used in the macro definition.

Macro Actual Parameter—A sequence of tokens provided at the site of a macro invocation, corresponding to a macro formal parameter specified in the definition of the macro. Correspondence is established positionally; the first sequence of tokens is substituted at every point the first macro formal parameter is named in the macro body, and so on.

Macro Actual Parameter Substitution—The fragment of program source produced by substituting a macro actual parameter for a macro formal parameter within the expansion of a macro.

Macro Expansion—The fragment of program source produced by substituting the sequence of tokens defined to be the body of a macro, at a point where the macro is named in a program source.

Macro Formal Parameter—An identifier declared in a macro definition, and used (named) zero or more times in the body of the macro. At each point where the formal parameter is named in the macro body, the sequence of tokens provided at the point of macro invocation as the corresponding macro actual parameter will be substituted within the macro expansion.

Macro Interface—The syntax by which a macro is invoked. This always includes the name of the macro. It will include a parenthesized list of macro actual parameters if any macro formal parameters are specified in the macro's definition; there must be one actual parameter for each formal parameter.

Macro Invocation—The use of a macro name within program text, resulting in the preprocessor or compiler substituting the body of the macro at that point in the program source.

Macro Mechanism—The means by which macros are specified, invoked, and expanded in the processing of a program source.

Order-Adjacent Children—In the context of doing a shallow in-order traversal of the children of a node in a hierarchical tree, order-adjacent children are any subset of the children where the members of the subset are all visited by the in-order traversal without visiting any children of the node which are not in the subset.

Parsing—A means of determining the syntactic structure of a source program. Figuratively, if the tokens of a source program are like the words of a book, parsing acts as the means of recognizing the sentence, paragraph, section, and chapter structure of the book. In practice, parsing of program source may be done by many alternative methods, such as recursive descent, LL(1) parsing, and LR(1) parsing. See Aho, Sethi, and Ullman, *Compilers: Principles, Techniques, and Tools*, Addison-Wesley, 1985.

Point of Definition—The point in a program source where a construct is initially named and otherwise specified.

Preprocessor Characteristics—Synonym for "virtual source production mechanisms".

Preprocessor Language—The rules by which preprocessor characteristics are interpreted by a compiler or preprocessor.

Preprocessor Mechanism—Synonym for "virtual source production mechanism".

Program—Same as "Computer Program".

Program Source—The memory (one or more source files) in which the text representing a computer program resides.

Programming Language—Same as "Computer Programming Language".

Programmer—An individual who writes a computer program.

Proprietary High-Level Language—A programming language whose definition is owned by a given company, rather than being in the public domain. Proprietary languages are typically developed for special purposes, or are historical artifacts.

Ptal—"Portable Transaction Application Language". The proprietary programming language which the Rosetta translator translates to the industry-standard programming language "C++".

Rosetta Translator—The Tandem Computers Inc. product which will embody this invention. It is named after the "Rosetta Stone", which was a key to translating ancient Egyptian languages.

Scanning—The computer method of examining the text of a computer program one character at a time, recognizing the adjacent groups of characters as tokens.

Scope—The region of program text in which an identifier is recognized to have a certain meaning. For example, a macro formal parameter only has "scope" within the macro body; it is not recognized before the front of the macro definition, nor after its end.

Semantic Analysis—Processing of a syntax tree by a compiler to determine additional information about the program necessary to generate a correct code file for the program.

Shallow In-Order Traversal—In the context of a hierarchical tree structure, a shallow in-order traversal from a node within the tree visits the immediate children of the node in first-to-last order. This ordering is usually represented graphically by placing the child node which is first in order as the left-most child of the node, the next child node immediately to its right, and so on.

Source Code—The program source for a program which is to be translated.

Source File—The computer memory—usually kept on durable media such as magnetic disk—where part or all of a program source is kept.

Source File Inclusion—Programming language construct for specifying that the sequence of tokens contained by a source file named in the construct should be substituted in the program source for the source file inclusion specification. Also, the result of that inclusion.

Source Inclusion Mechanism—The means by which source file inclusion is specified in program source and accomplished by a compiler or preprocessor.

Source Language—The computer programming language in which a program to be translated is specified.

Source Language Text—A program source specified in a source language.

Standardized High-Level Language—A computer language whose definition is in the public domain, specified by one or more official or de-facto standards. There are typically compilers available for standard languages on many brands and models of computers.

Static Fragment—The portion of program source which specifies the sequence of tokens which are to be substituted when a virtual source production mechanism is invoked.

Subtree—A node in a tree, plus all the descendants of that node, plus all their descendants, etc.

Syntactic Construct—A sequence of tokens specifying some computer operation. Examples of constructs include naming of memory locations and performing arithmetic operations on those locations.

Syntactic Construct Boundary—The first and last tokens used to specify the use of a syntactic construct.

Syntax—The rules by which tokens in a program source are interpreted to specify constructs in a programming language.

Target Language—The computer programming language produced by a language-to-language translator such as Rosetta. (The language "aimed at", ergo the "target language".)

Target Language Code—The textual specification of a translated computer program in a target language.

Target Language Output Files—Source files representing a program in the target language. Referred to as "output files" because they are the results (outputs) of the translation process.

Target Language Text—Synonym for target language code.

Target High-Level Language—The computer programming language to which a program is to be translated.

Textual Mismatch—Having one or more characters which are not the same between two fragments at the same relative offset.

Token—A collection of adjacent characters in a program source which forms a single symbol, constant, operator, or punctuation mark.

Translation—The process of rendering a program specified in one programming language into an equivalent program expressed in another programming language.

Translation Session—A single execution of a language-to-language translator; note that a single session may translate numerous source files.

Tree—A directed acyclic graph with a single node identified as a "root".

Tree Surgery—A modification of a valid hierarchical tree data structure to yield another, but different valid hierarchical tree data structure. In the context of this patent, tree surgery is done to interpose encapsulating fragments in fragment trees, or more generally, to interpose shallow-in-order-traversal-reconciliation nodes.

Type Cast—A programming language operation which specifies that an operand of one data type (e.g. integer) should be converted to and treated as being of another data type (e.g. real).

Type Compatibility Rules—Programming language rules (usually enforced by the compiler used) governing how operands of different types (e.g. alphanumeric text, integers, and real numbers) may be used together in operations such as arithmetic, comparisons, and data movement.

Virtual Fragment—The sequence of tokens which results directly from the invocation of a virtual source production mechanism.

Virtual Source—A program's virtual source is the stream of tokens that a compiler parses to create a syntax tree representing the program. Virtual source does not necessarily exist in textual form in any single source file; the token stream is created by a series of macro expansions, macro formal parameter substitutions, and source inclusions.

Virtual Source Production Mechanism—Any of the means of specifying text substitution in a programming language, including source file inclusion, macro expansion, and macro actual parameter substitution. The text resulting from the combination of all such means in a computer program is called its "virtual source", hence the means are collectively called "virtual source production mechanisms".

Yield—In the context of doing a shallow in-order traversal of the children of a node in a hierarchical tree, the "yield" is the sequence of values of interest obtained as each child is visited. In a virtual fragment tree, for example, a shallow in-order traversal from a node representing a virtual fragment would visit the subordinate virtual fragments and tokens which are the immediate descendants of the node. The values of interest for the subordinate virtual fragments would be the text of the invocation expressions for those subordinate fragments; the values of interest for the tokens would be the text necessary to represent the tokens. The overall yield of the traversal would be the ordered text of the invocation expressions and tokens which make up the represented virtual fragment.

DESCRIPTION OF THE PREFERRED EMBODIMENT

A prior art tree data structure is outlined in FIG. 1. The purpose of this data structure is to relate a set of "things" or objects in a hierarchy. One object in this set, called the root node, is at the vertex. From the root, links, called branches, connect to other objects, called nodes. In turn, the nodes may branch to other nodes ultimately terminating in a set of objects called leaves. Viewing the tree from the root to the leaves, tracing a single path of branches, nodes are ancestors of each other. Conversely, viewing the tree from a leaf to the root, again tracing a single path, nodes are descendants of each other. Choosing an arbitrary node, it is considered the child of the node to which it branches toward the root and the parent of the node branching toward the leaves. There are no cycles in a tree; an object is never directly or indirectly its own ancestor.

Figure 2A:
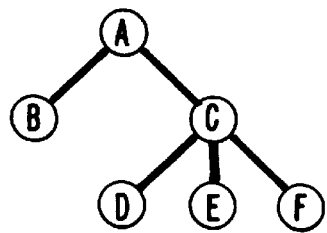
FIG. 2A depicts a hierarchical tree structure before encapsulating tree surgery.
Figure 2B:
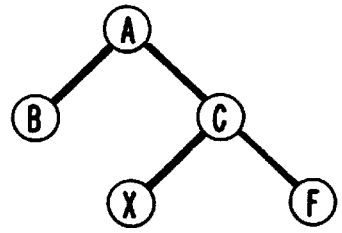
FIG. 2B depicts a hierarchical tree structure before encapsulating tree surgery.
Figure 2C:
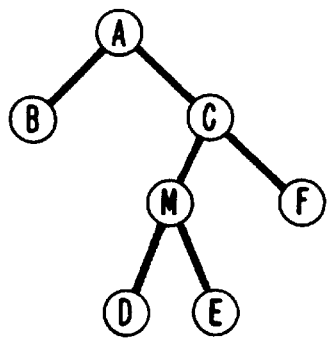
FIG. 2C depicts the hierarchical tree structure of FIG. 2A after encapsulating tree surgery.
Figure 2D:
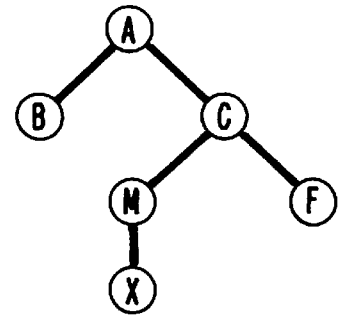
FIG. 2D depicts the hierarchical tree structure of FIG. 2B after encapsulating tree surgery.

FIG. 2A, FIG. 2B, FIG. 2C, and FIG. 2D illustrate a contribution of the present invention to the prior art. It is termed "encapsulating tree surgery." Referring to FIG. 2A and FIG. 2B, a first and a second tree are shown. There is a node containing the data item C in the first tree and a second node containing the same data item C in the second tree. The purpose of the tree surgery is to change both the first and the second tree so that a shallow in-order traversal of each yields an exactly corresponding set of nodes. As shown in FIG. 2C and FIG. 2D, this is achieved by:

Removing, but keeping in order and not discarding, the differing subordinates from the first and second nodes;

Creating a subnode with data item M as a child of the first node;

Creating a second subnode with the same data item M as a child of the second node;

Making the differing subordinates which were removed from the first node children of the first subnode; and Making tile FIG. 2A subordinates D and E, which were removed from the second node, children of the FIG. 2C second subnode M.

Figure 3:
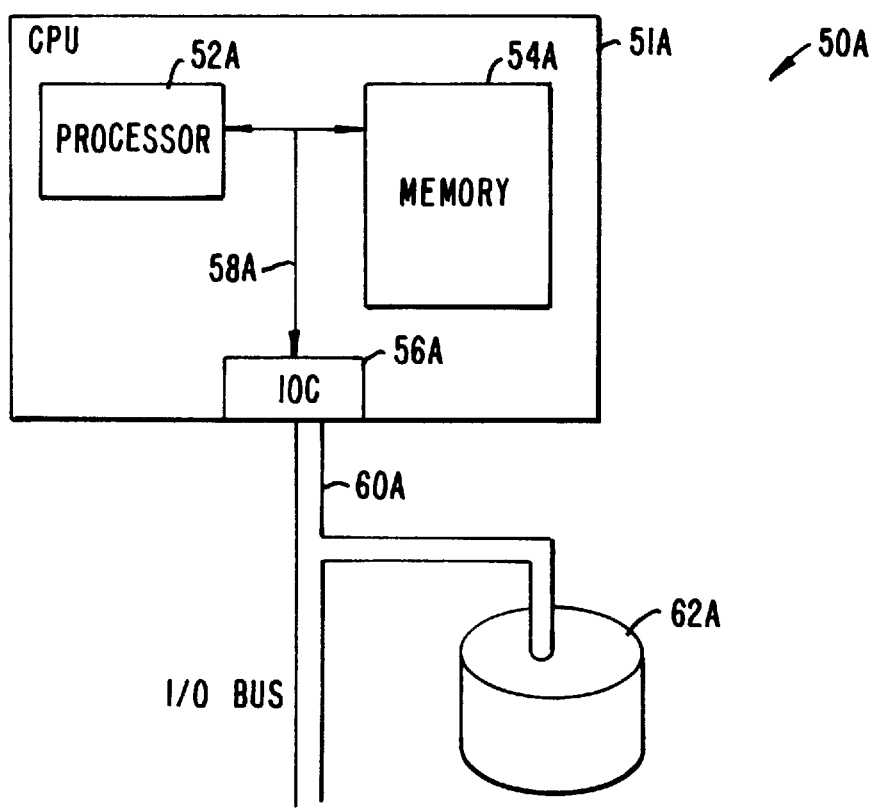
FIG. 3 is a simplified block diagram of a computing system for use with the present invention.

FIG. 3 is a simplified block diagram of a computer system, designated generally with the reference numeral 50A, incorporating the data structure of FIG. 1. As FIG. 3 illustrates, the computing system 50A includes a central processing unit (CPU) 51A that is coupled to a memory 54A and an input/output channel (IOC) 56A by a bus structure 58A. IOC 56A, in turn, connects the CPU 51A to a data storage area 62A by an input/output (I/O) 60A. The data storage area 62A may take the form of a magnetic disk media storage device, an electronic memory, or a communications link to other storage areas.

Figure 4:
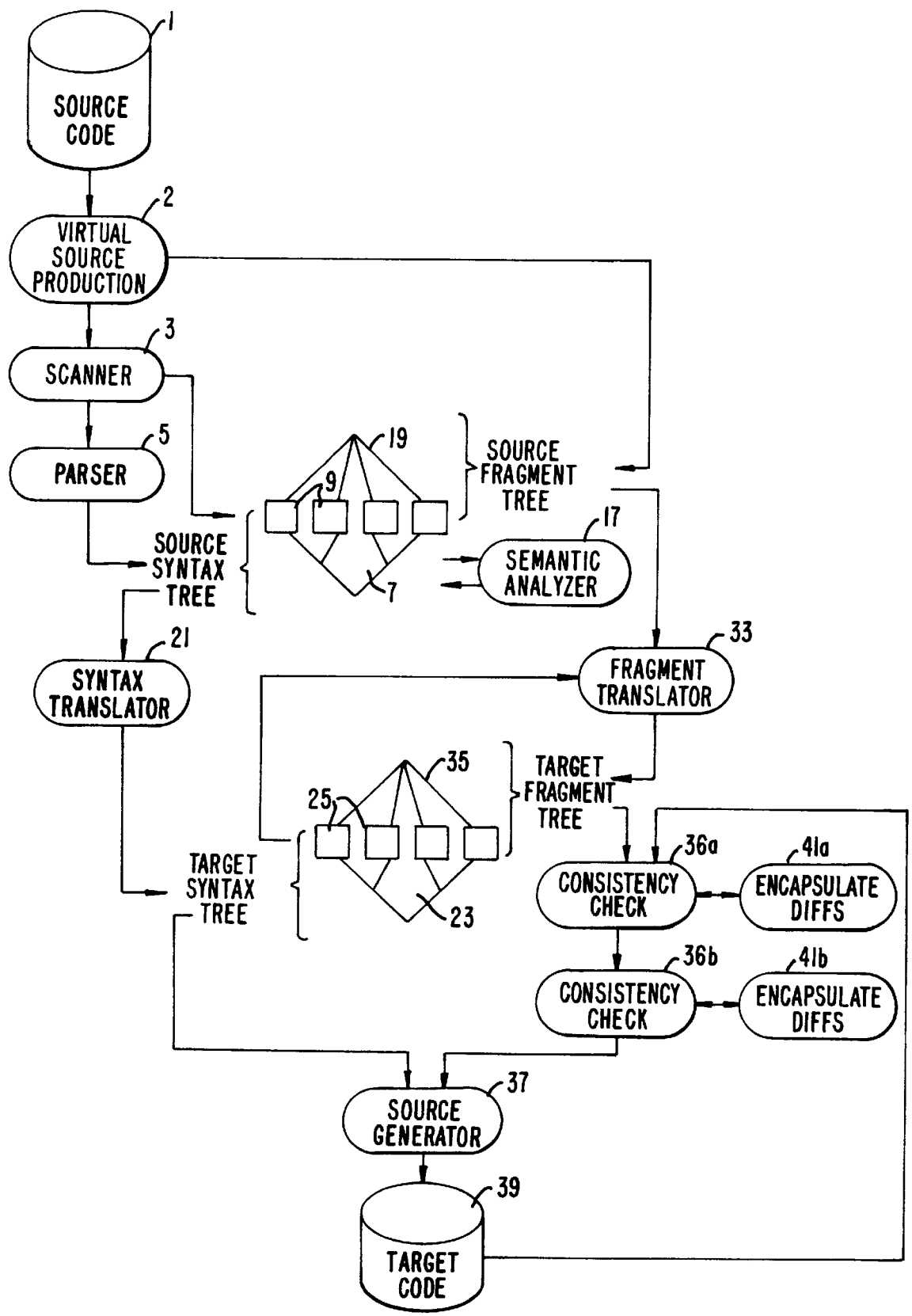
FIG. 4 illustrates the source code to source code translator of the present invention in simplified form.

As illustrated in FIG. 4, the source code to source code translator of the present invention, in simplified form, generally follows the flow of the translator of the parent application. The primary difference is the additional step of encapsulation while performing consistency checks as depicted by 36a, 36b, 41a and 41b.

Figure 5:
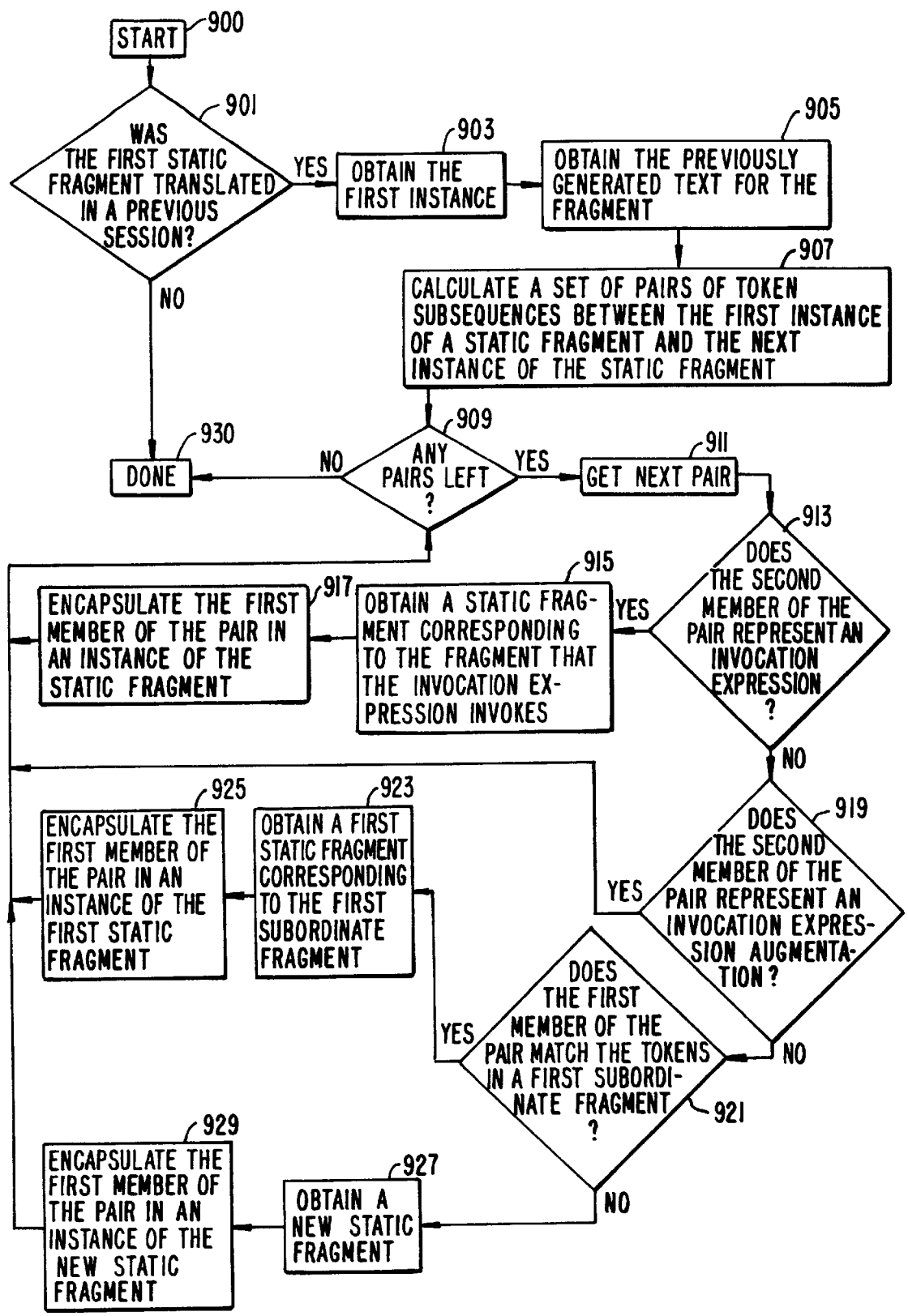
FIG. 5 is a flowchart of the method of the current invention for consistency checking between a current translation session and a prior session.

FIG. 5 is a flowchart of performing consistency checks of static fragments produced by different translation sessions. A program may consist of a number of files, some of which may be translated during different sessions. All translations must share the same definition of each static fragment; therefore all translations of static fragments must be checked for consistency. The method comprises calculating the differences among fragments, identifying invocation expressions, matching tokens, and encapsulating differing token subsequences.

Figure 6:
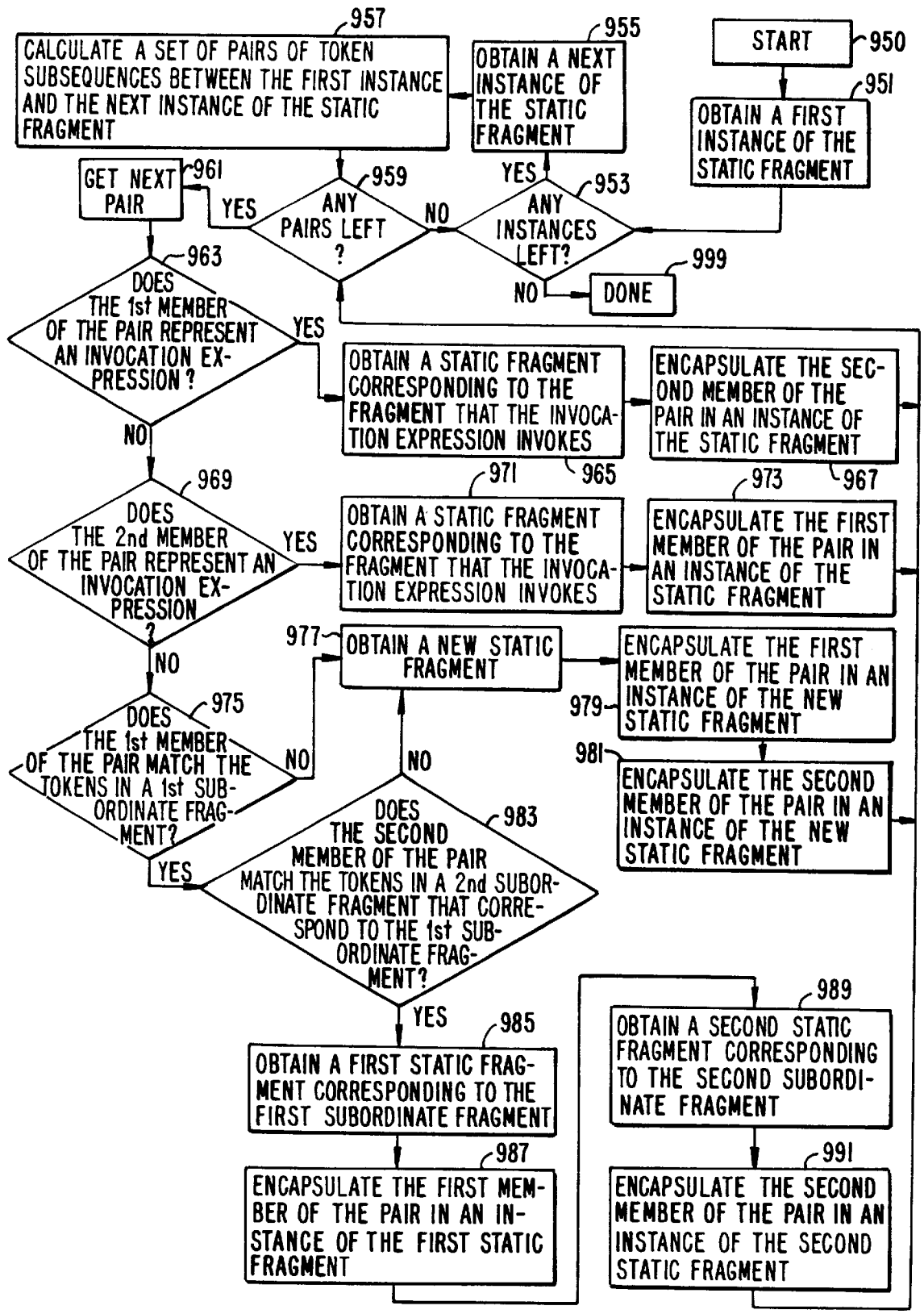
FIG. 6 is a flowchart of the method of the current invention for consistency checking among fragments produced by a current translation session.

FIG. 6 is a flowchart of performing consistency checks of virtual fragments produced within a current translation session. Each static fragment of a program source may have many instances, the translation of which are virtual fragments in a target virtual fragment tree. A text rendering of one of these instances (called the reference instance) will become a target static fragment which is the translation of the source static fragment, and must accurately represent all of the virtual fragments which are instances of the target static fragment. Therefore all translations of each static fragment must be checked for consistency; a text rendering of each must be textually the same as the text rendering of the reference instance.

The method shown in FIG. 6 comprises calculating the differences among fragments, identifying invocation expressions, matching tokens, and encapsulating differing token subsequences.

Figure 7:
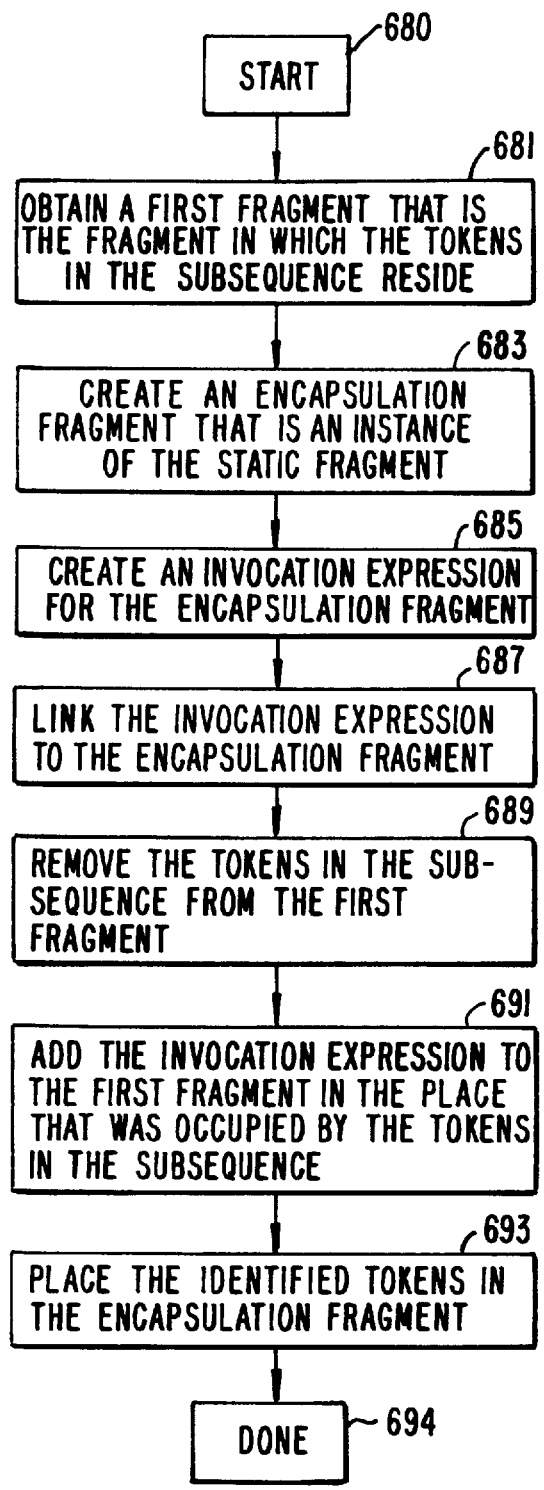
FIG. 7 is a flowchart of the method of the current invention for encapsulating a token subsequence.

FIG. 7 is a flowchart of encapsulating a token subsequence. It is an implementation of the method of tree encapsulation surgery shown in FIG. 2A, FIG. 2B, FIG. 2C, and FIG. 2D. Control commences at terminal block 680 and immediately flows into function block 681, where the first fragment in which identified tokens reside is acquired. In function block 683, an encapsulation fragment is created which is an instance of the static fragment. Then, in function block 685, an invocation expression for the encapsulation fragment is created. An invocation expression is linked to the encapsulation fragment in function block 687. In function block 689, the identified tokens are removed from the first fragment. In function block 691, the invocation expression is added to the first fragment in the place which was occupied by the removed identified tokens. Finally, in function block 693, the identified tokens are placed in the encapsulation fragment.

Figure 8:
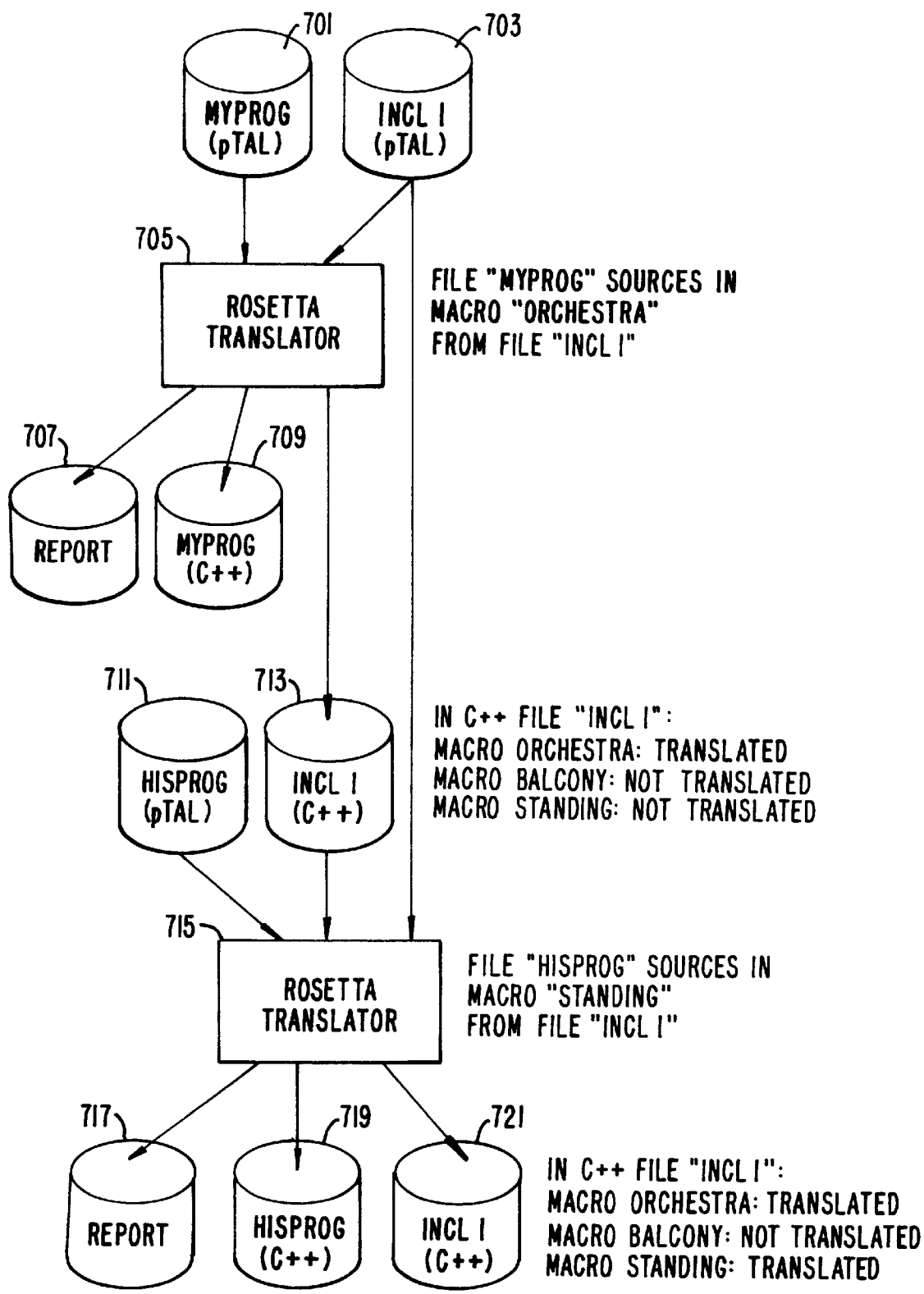
FIG. 8 is a simplified block diagram illustrating two translation sessions using the same included file.

FIG. 8 is a simplified example showing two executions of the translator performing consistency checks between two translations of a shared source file. Two source files 701 and 703 are input to translator session 705. The translator session 705 produces a report 707, a translation 709 of source file 701, and a first translation 713 of source file 703. Next, two source files 711 and 713 are input to translator session 715. Translator session 715 produces a report 717, a translation 719 of source file 711, and a second translation 721 of source file 703. Translation 721 supersedes translation 713. That is, translation 721 includes a superset of the valid static fragment translations which were included in translation 713.

FIG. 8 illustrates two invocations of the Rosetta Translator. The first 705 takes "myprog" 701 as a primary input file, which in turn sources in the text file "incl1" 703.

--- pTAL file "incl1"

define orchestra(champagne) = (champagne * 2)#;
define balcony(beer) = (21 + beer / 2)#;
define standing(soda) = (soda + 1)#;

-continued

```
pTAL file "myprog"

?source incl1
proc p;
begin
    int x;
    x := orchestra(x);
end;
```

After the first translation session 705, the macros that the program used have been translated; those that the program has not used have not. The translation session generates a C++-coded "myprog" file 709 and a C++-coded "incl1" file 713.

```
C++ file "incl1"

#define orchestra(champagne) (champagne * 2)
#define balcony(beer)
#define standing(soda)
C++ fiel "myprog"

#include "incl1"
void p {
    short x;
    x = orchestra(x);
};
```

The second translation session 715 takes a pTAL program file "hisprog" 711 as the primary input file, which in turn sources in the pTAL file "incl1" 703. Because the pTAL file "incl1" has been partially translated, the second translation session 715 takes the C++-coded version of "incl1" 713 as input so that it can perform a consistency check.

```
pTAL file "hisprog"

?source incl1
proc z;
begin
    int a;
    a := standing(2);
end;
```

After the second translation session 715, the macros that any previously translated program have used have been translated; those that no translated program have used have not been translated. The second translation session generates a C++-coded "hisprog" file 719 and an augmented C++ coded "incl1" file 721.

```
C++ file "hisprog"

#include "incl1"
void z {
    short a;
    a = standing(2);
}
C++ file "incl1"

#define orchestra(champagne) (champagne * 2)
#define balcony(beer)
#define standing(soda) (soda + 1)
```

FIG. 9 is en example of a virtual fragment tree. FIG. 10 is a second example of a virtual fragment tree which is an instance of the same static fragment of which the virtual fragment tree in FIG. 9 is an instance. The fragment subtrees in FIG. 9 and FIG. 10 illustrate that the two instances of the macro expansion contain sequences of tokens that do not match textually.

FIG. 11 shows FIG. 9 as modified by the insertion of a ghost formal. Likewise FIG. 12 shows FIG. 10 as modified by the insertion of a ghost formal. The translator adjusts the target language fragment tree in both places to encapsulate the difference in ghost formal parameters. The dashed lines indicate instances of actual parameters.

FIG. 13 is an example of a virtual fragment tree that contains a use of a macro parameter. FIG. 14 is a second example of a virtual fragment tree that contains a use of a macro parameter. The tree in FIG. 13 and the tree in FIG. 14 are instances of the same static fragment. The fragment trees in FIG. 13 and FIG. 14 illustrate two instances of a macro expansion that contain sequences of tokens that do not match textually. Furthermore, the mismatching tokens in each example match the tokens encapsulated in the existing macro formal use fragment that is subordinate to the macro expansion fragment.

FIG. 15 shows FIG. 13 after it is modified by inserting an additional use of the existing macro formal parameter, sname. Likewise, FIG. 16 shows FIG. 14 after it is modified by inserting an additional use of the existing macro formal parameter, sname. The translator adjusts the target language fragment tree in both places to encapsulate the difference in an additional use of the existing parameter.

Figure 19:
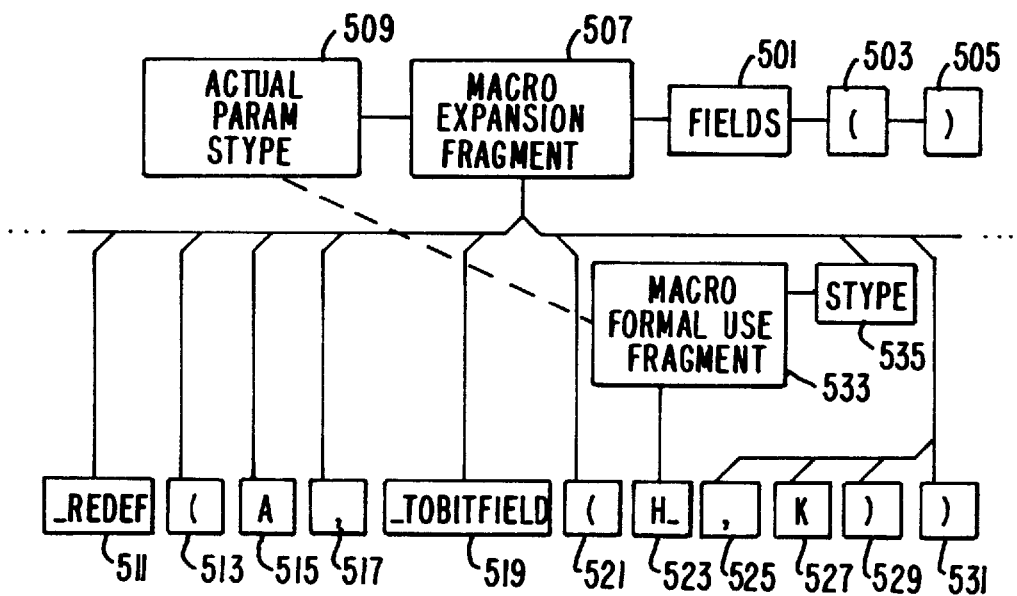
FIG. 19 is an example of the virtual fragment tree of FIG. 18 into which a formal use has been propagated.

FIG. 17 is the same as FIG. 11. A macro formal parameter use has been inserted into this tree to encapsulate the textual difference between this first instance of this macro expansion and a second instance of the expansion of the same macro. FIG. 18 shows a third expansion of the same macro. The sequence of tokens in the macro expansion fragment illustrated in FIG. 17 do not match the sequence of tokens in the macro expansion fragment illustrated in FIG. 18. In particular, the token "stype" in FIG. 17 is not textually identical to the token "h__" in FIG. 18. Because the tokens in the first differing subsequence ("stype") represent a fragment invocation, the tokens in the second differing subsequence can be encapsulated in a new instance of the fragment that the first subsequence of tokens invokes. This transformation is called propagating the encapsulation to a new fragment. FIG. 19 shows the fragment from FIG. 18 after the encapsulation.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. In a computer system, a computer-implemented method for modifying an ordered list of elements, said method comprising:

traversing a first ordered list of elements in a shallow in-order manner, producing a first ordered yield of elements, and traversing a second ordered list in a shallow in-order manner, producing a second ordered yield of elements;

comparing said first and second yields;

identifying a first element in said first yield and a second element in said second yield, said first and second elements being the respective first element where said first and second yields differ;

identifying a first sub-list of adjacent elements of said first yield beginning with said first element and a second sub-list of adjacent elements of said second yield beginning with said second element, such that removal of the first sub-list from the first yield and removal of the second sub-list from the second yield would cause the first and second removal-modified yields elements to be equivalent;

removing the first sub-list from the first list, thus creating a former position of the first sub-list;

inserting a first new element at the former position of the first sub-list, said first new element representing similarities between said first and second sub-lists and differences between the similarities and the first sub-list.

2. A medium for data storage wherein is located a computer program for modifying an ordered list of elements by traversing first ordered list of elements in a shallow in-order manner, producing a first ordered yield of elements, and traversing a second ordered list in a shallow in-order manner, producing a second ordered yield of elements;

comparing said first and second yields;

identifying a first element in said first yield and a second element in said second yield, said first and second elements being the respective first element where said fist and second yields differ;

identifying a first sub-list of adjacent elements of said first yield beginning with said first element and a second sub-list of adjacent elements of said second yield beginning with said second element, such that removal of the first sub-list from the first yield and removal of the second sub-list from the second yield would cause the first and second removal-modified yields elements to be equivalent;

removing the first sub-list from the fist list, thus creating a former position of the first sub-list;

inserting a first new element at the former position of the first sub-list, said first new element representing similarities between said first and second sub-lists and difference between the similarities and the first sub-list.

3. A computer system comprising the medium of claim 2:

a processor for executing the computer program in the medium;

a bus, coupling the medium and the processor.

4. A computer-implemented method for modifying a first directed acyclic graph having a single node identified as a root, said method comprising:

traversing said first graph in a shallow in-order manner, producing a first ordered yield of nodes, and traversing a second directed acyclic graph in a shallow in-order manner, said second graph having a single node identified as a root, producing a second ordered yield of nodes;

comparing said first and second yields;

identifying a first node in said first yield and a second node in said second yield, said first and second nodes being the respective first node where said first and second yields differ;

identifying a first set of order-adjacent children of the parent of said first node and a second set of order-adjacent children of the parent of said second node, such that disconnection of the elements of the first set from the first node and disconnection of the elements of the second set from the second node would cause the child in-order yield of the parents of said first and second nodes to be equivalent;

disconnecting the elements of the first set;

disconnecting the elements of the second set;

inserting a first new node as a child of the parent of the first node;

inserting a second new node as a child of the parent of the second node;

connecting said disconnected elements in the first set as children to said first new node, wherein the relative order of the children of said first new node is the same as the relative order when said previously disconnected nodes were direct descendants of said parent of said first node; and connecting said disconnected elements in the second set as children to said second new node, wherein the relative order of the children of said second new node is the same as the relative order when said previously disconnected nodes were direct descendants of said parent of said second node.

5. A medium for data storage wherein is located a computer program for modifying a first directed acyclic graph having a single node identified as a root by traversing said first graph in a shallow in-order manner, producing a first ordered yield of nodes, and traversing a second directed acyclic graph in a shallow in-order manner, said second graph having a single node identified as a root, producing a second ordered yield of nodes;

comparing said first and second yields;

identifying a first node in said first yield and a second node in said second yield, said first and second nodes being the respective first node where said first and second yields differ;

identifying a first set of order-adjacent children of the parent of said first node and a second set of order-adjacent children of the parent of said second node, such that disconnection of the elements of the first set from the first node and disconnection of the elements of the second set from the second node would cause the child in-order yield of the parents of said first and second nodes to be equivalent;

disconnecting the elements of the first set;

disconnecting the elements of the second set;

inserting a first new node as a child of the parent of the first node;

inserting a second new node as a child of the parent of the second node;

connecting said disconnected elements in the first set as children to said first new node, wherein the relative order of the children of said first new node is the same as the relative order when said previously disconnected nodes were direct descendants of said parent of said first node; and connecting said disconnected elements in the second set as children to said second new node, wherein the relative order of the children of said second new node is the same as the relative order when said previously disconnected nodes were direct descendants of said parent of said second node.

6. A computer system comprising:

means for traversing a first directed acyclic graph having a single node identified as root in a shallow in-order manner, producing a first ordered yield of nodes and for traversing a second directed acyclic graph having a single node identified as root in a shallow in-order manner, producing a second ordered yield of nodes;

means for comparing said first and second yields;

means for identifying a first node in said first yield and a second node in said second yield, said first and second nodes being the respective first node where said first and second yields differ;

means for identifying a first set of order-adjacent children of the parent of said first node and a second set of order-adjacent children of the parent of said second node, such that disconnection of the elements of the first set from the first node and disconnection of the elements of the second set from the second node would cause the child in-order yield of the parents of said first and second nodes to be equivalent;

means for disconnecting the elements of the first set;

means for disconnecting the elements of the second set;

means for inserting a first new node as a child of the parent of the first node;

means for inserting a second new node as a child of the parent of the second node;

means for connecting said disconnected elements in the first set as children to said first new node, wherein the relative order of the children of said first new node is the same as the relative order when said previously disconnected nodes were direct descendants of said parent of said first node; and means for connecting said disconnected elements in the second set as children to said second new node, wherein the relative order of the children of said second new node is the same as the relative order when said previously disconnected nodes were direct descendants of said parent of said second node.

7. The method of claim 1 wherein said step of traversing comprises traversing the ordered list of elements in a shallow, reverse-order manner.

8. The method of claim 1 wherein said step of inserting comprises inserting the first new element at the former position of the first sub-list, said first new element representing the differences as parameters.

9. The method of claim 1 further comprising the steps of removing the second sub-list from the second list, thus creating a former position of the second sub-list; and inserting a second new element at the former position of the second sub-list, said second new element representing the similarities and the differences between the similarities and the second sub-list.

10. The method of claim 9 wherein said step of traversing comprises traversing the ordered list of elements in a shallow, reverse-order manner.

11. The method of claim 9 wherein said steps of inserting comprise inserting the first new element at the former position of the first sub-list, said first new element representing the differences as parameters; and inserting the second new element at the former position of the second sub-list, said second new element representing the differences as said parameters.

12. The medium of claim 2 wherein said computer program modifies by further removing the second sub-list from the second list, thus creating a former position of the second sub-list; and inserting a second new element at the former position of the second sub-list, said second new element representing the similarities and the differences between the similarities and the second sub-list.

13. The medium of claim 2, comprising a hard drive.

14. The computer system of claim 3 wherein said medium comprises a hard drive.

15. An apparatus for modifying an ordered list of elements, said apparatus comprising:

means for traversing a first ordered list of elements in a shallow in-order manner, producing a first ordered yield of elements, and traversing a second ordered list in a shallow in-order manner, producing a second ordered yield of elements;

means for comparing said first and second yields;

means for identifying a first element in said first yield and a second element in said second yield, said first and second elements being the respective first element where said first and second yields differ;

means for identifying a first sub-list of adjacent elements of said first yield beginning with said first element and a second sub-list of adjacent elements of said second yield beginning with said second element, such that removal of the first sub-list from the first yield and removal of the second sub-list from the second yield would cause the first and second removal-modified yields elements to be equivalent;

means for removing the first sub-list from the first list, thus creating a former position of the first sub-list;

means for inserting a first new element at the former position of the first sub-list, said first new element representing similarities between said first and second sub-lists and differences between the similarities and the first sub-list.

16. An apparatus for modifying an ordered list of elements, said apparatus comprising:

a traverser for traversing a first ordered list of elements in a shallow in-order manner, producing a first ordered yield of elements, and traversing a second ordered list in a shallow in-order manner, producing a second ordered yield of elements;

a comparator for comparing said first and second yields;

an identifier for identifying a first element in said first yield and a second element in said second yield, said first and second elements being the respective first element where said first and second yields differ;

an identifier for identifying a first sub-list of adjacent elements of said first yield beginning with said first element and a second sub-list of adjacent elements of said second yield beginning with said second element, such that removal of the first sub-list from the first yield and removal of the second sub-list from the second yield would cause the first and second removal-modified yields elements to be equivalent;

a remover for removing the first sub-list from the first list, thus creating a former position of the first sub-list;

an inserter for inserting a first new element at the former position of the first sub-list, said first new element representing similarities between said first and second sub-lists and differences between the similarities and the first sub-list.

17. The method of claim 4 wherein said step of traversing comprises traversing the ordered list of elements in a shallow, reverse-order manner.

18. The medium of claim 5, comprising a hard drive.

19. An apparatus for modifying a first directed acyclic graph having a single node identified as a root, said apparatus comprising:

a traverser for traversing said first graph in a shallow in-order manner, producing a first ordered yield of nodes, and traversing a second directed acyclic graph in a shallow in-order manner, said second graph having a single node identified as a root, producing a second ordered yield of nodes;

a comparator for comparing said first and second yields;

an identifier for identifying a first node in said first yield and a second node in said second yield, said first and second nodes being the respective first node where said first and second yields differ;

an identifier for identifying a first set of order-adjacent children of the parent of said first node and a second set of order-adjacent children of the parent of said second node, such that disconnection of the elements of the first set from the first node and disconnection of the elements of the second set from the second node would cause the child in-order yield of the parents of said first and second nodes to be equivalent;

a disconnector for disconnecting the elements of the first set;

a disconnector for disconnecting the elements of the second set;

an inserter for inserting a first new node as a child of the parent of the first node;

an inserter for inserting a second new node as a child of the parent of the second node;

a connector for connecting said disconnected elements in the first set as children to said first new node, wherein the relative order of the children of said first new node is the same as the relative order when said previously disconnected nodes were direct descendants of said parent of said first node; and a connector for connecting said disconnected elements in the second set as children to said second new node, wherein the relative order of the children of said second new node is the same as the relative order when said previously disconnected nodes were direct descendants of said parent of said second node.

20. A computer system comprising:

the medium of claim 5;

a processor for executing the computer program in the medium;

a bus, coupling the medium and the processor.

21. The computer system of claim 20 wherein said medium comprises a hard drive.

* * * * *